US009557408B2

(12) United States Patent
Chernukhin (10) Patent No.: US 9,557,408 B2
(45) Date of Patent: Jan. 31, 2017

(54) DIGITAL RECEIVER TECHNIQUES IN RADAR DETECTORS

(71) Applicant: Escort Inc., West Chester, OH (US)

(72) Inventor: Igor Chernukhin, Toronto (CA)

(73) Assignee: Escort, Inc., West Chester, OH (US)

( * ) Notice: Subject to any disclaimer, the term of this patent is extended or adjusted under 35 U.S.C. 154(b) by 0 days.

(21) Appl. No.: 14/665,585

(22) Filed: Mar. 23, 2015

(65) Prior Publication Data

US 2015/0192661 A1    Jul. 9, 2015

Related U.S. Application Data

(60) Division of application No. 12/881,729, filed on Sep. 14, 2010, now Pat. No. 8,988,272, which is a continuation-in-part of application No. 12/749,728, filed on Mar. 30, 2010, now abandoned.

(51) Int. Cl.
     *G01S 7/02*      (2006.01)
     *G01S 7/48*      (2006.01)
     *G01S 13/88*      (2006.01)

(52) U.S. Cl.
     CPC ............ *G01S 7/022* (2013.01); *G01S 7/021* (2013.01); *G01S 7/4806* (2013.01); *G01S 13/88* (2013.01)

(58) Field of Classification Search
     CPC ........ G01S 7/022; G01S 7/021; G01S 7/4806; G01S 13/88
     USPC .............................................. 342/20, 21, 192
     See application file for complete search history.

(56) References Cited

U.S. PATENT DOCUMENTS

| 4,313,216 A | * | 1/1982 | Jaeger ................ G01S 7/285 |
| | | | 342/193 |
| 4,630,054 A | * | 12/1986 | Martinson ............ G01S 7/022 |
| | | | 342/20 |
| 4,631,542 A | | 12/1986 | Grimsley |
| 4,750,215 A | * | 6/1988 | Biggs ................. G01S 7/022 |
| | | | 342/20 |
| 4,841,302 A | | 6/1989 | Henry |
| 4,862,175 A | * | 8/1989 | Biggs ................. G01S 7/022 |
| | | | 342/20 |
| 4,952,936 A | * | 8/1990 | Martinson ............ G01S 7/022 |
| | | | 331/107 DP |
| 4,954,828 A | * | 9/1990 | Orr ..................... G01S 7/022 |
| | | | 342/20 |

(Continued)

OTHER PUBLICATIONS

International Search Report for PCT/US2011/030545, mailed Mar. 30, 2011.

(Continued)

*Primary Examiner* — Peter Bythrow
(74) *Attorney, Agent, or Firm* — Dinsmore & Shohl LLP (57) ABSTRACT

A method and apparatus are provided for detecting a RADAR signal. RADAR channel data in a frequency range is received, where the frequency range is divided into a plurality of equally wide channels. The received RADAR channel data is digitally processed and analyzed to identify a signal in the RADAR channel data in the frequency range. The frequency range is advanced to a next channel of the plurality of channels, where the frequency range of the next channel of the plurality of channels is nonsequential with the frequency range of the first channel. The steps of receiving, processing, and analyzing are repeated for the next channel of the plurality of channels.

18 Claims, 9 Drawing Sheets

(56) References Cited

U.S. PATENT DOCUMENTS

| | | | |
|---|---|---|---|
| 4,961,074 A | 10/1990 | Martinson | |
| 5,068,663 A * | 11/1991 | Valentine | G01S 7/022 342/20 |
| 5,079,553 A * | 1/1992 | Orr | G01S 7/022 342/20 |
| 5,134,406 A | 7/1992 | Orr | |
| 5,164,729 A | 11/1992 | Decker et al. | |
| 5,250,951 A | 10/1993 | Valentine et al. | |
| 5,300,932 A * | 4/1994 | Valentine | G01S 3/18 342/20 |
| 5,305,007 A * | 4/1994 | Orr | G01S 7/022 342/20 |
| 5,315,302 A * | 5/1994 | Katsukura | G01S 7/022 342/20 |
| 5,440,228 A * | 8/1995 | Schmidt | G01S 7/021 324/76.12 |
| 5,461,383 A * | 10/1995 | Ono | G01S 7/022 342/20 |
| 5,646,624 A | 7/1997 | Cope et al. | |
| 5,835,052 A * | 11/1998 | Iwakuni | G01S 7/022 342/100 |
| 5,852,417 A | 12/1998 | Valentine et al. | |
| 5,856,801 A | 1/1999 | Valentine et al. | |
| 5,900,832 A * | 5/1999 | Valentine | G01S 7/021 342/20 |
| 5,917,441 A * | 6/1999 | Valentine | G01S 7/022 342/20 |
| 5,990,821 A | 11/1999 | Sakar | |
| 6,069,580 A * | 5/2000 | Martinson | G01S 7/022 342/165 |
| 6,140,809 A | 10/2000 | Doi | |
| 6,175,324 B1 * | 1/2001 | Valentine | G01S 7/022 342/20 |
| 6,239,735 B1 | 5/2001 | Ono | |
| 6,400,305 B1 * | 6/2002 | Kuhn | G01S 7/022 342/193 |
| 6,400,306 B1 | 6/2002 | Nohara et al. | |
| 6,463,091 B1 | 10/2002 | Zhodzicshsky et al. | |
| 6,617,995 B2 * | 9/2003 | Kim | G01S 7/022 180/170 |
| 6,670,905 B1 * | 12/2003 | Orr | G01S 7/022 342/175 |
| 6,693,578 B1 | 2/2004 | Martinson | |
| 7,023,374 B2 * | 4/2006 | Jossef | G01S 7/022 342/15 |
| 7,061,423 B1 * | 6/2006 | Valentine | G01S 7/022 342/100 |
| 7,215,276 B2 | 5/2007 | Batten et al. | |
| 7,301,453 B2 | 11/2007 | Fry | |
| 7,388,537 B2 | 6/2008 | Martinson et al. | |
| 7,948,427 B2 | 5/2011 | Wen et al. | |
| 7,999,721 B2 | 8/2011 | Orr | |
| 8,180,392 B2 * | 5/2012 | Sekiya | G01S 7/021 342/159 |
| 8,624,771 B2 | 1/2014 | Kuhn | |
| 8,988,272 B2 * | 3/2015 | Chernukhin | G01S 7/022 342/192 |
| 2004/0151137 A1 | 8/2004 | McFarland et al. | |
| 2004/0263378 A1 * | 12/2004 | Jossef | G01S 7/022 342/20 |
| 2005/0212672 A1 | 9/2005 | Fry | |
| 2006/0139203 A1 * | 6/2006 | Kim | G01S 7/021 342/20 |
| 2007/0018879 A1 | 1/2007 | Batten et al. | |
| 2009/0146863 A1 | 6/2009 | Wen et al. | |
| 2010/0019947 A1 | 1/2010 | Kruys et al. | |
| 2010/0075704 A1 | 3/2010 | McHenry et al. | |
| 2011/0241923 A1 | 10/2011 | Chernukhin | |
| 2012/0136559 A1 | 5/2012 | Rothschild | |

OTHER PUBLICATIONS

International Searching Authority, International Preliminary Report on Patentability PCT/US2014/022958 dated Sep. 15, 2015 (8 pages).

Chinese Patent Office, Decision of Rejection, Chinese PCT National Phase Patent Application No. 201180026491.1. dated Jan. 13, 2016 (8 pages).

English Translation of China Patent Office, Decision of Rejection, Chinese PCT National Phase Patent Application No. 201180026491.1 of Jan. 13, 2016 (14 pages).

\* cited by examiner

| N | BW | NUMBER OF AVERAGES: | | | | | | |
|---|---|---|---|---|---|---|---|---|
| | | NONE | 2 | 4 | 8 | 16 | 32 | 64 |
| 512 | 63.5 kHz | -9 | -4 | -2 | 0 | +1 | +2 | +3 |
| 1024 | 31.7 kHz | -6 | -1 | +1 | +3 | +4 | +5 | +6 |
| 2048 | 15.9 kHz | -3 | +2 | +4 | +6 | +7 | +8 | +9 |
| | | 24ms | 48ms | 96ms | 192ms | 384ms | 768ms | 1.5s |
| | | Duration of one complete detection cycle | | | | | | |

Percentage of all samples found within each amplitude range vs. number of averages:

| N of Averages: Range [dB]: | 1 | 2 | 4 | 8 | 16 | 32 | 64 |
|---|---|---|---|---|---|---|---|
| 1dB | 6.4% | 11.3% | 14.0% | 18.9% | 29.6% | 42.0% | 55.1% |
| 2dB | 16.0% | 23.1% | 26.4% | 40.7% | 54.2% | 72.2% | 87.1% |
| 3dB | 21.3% | 32.9% | 40.0% | 57.1% | 74.4% | 87.6% | 97.6% |
| 4dB | 27.6% | 41.3% | 52.0% | 68.9% | 84.4% | 95.1% | 99.6% |
| 5dB | 34.2% | 50.0% | 64.4% | 79.6% | 91.8% | 97.8% | 100.0% |
| 6dB | 41.3% | 58.2% | 74.9% | 87.3% | 96.2% | 99.3% | 100.0% |
| 7dB | 49.1% | 65.3% | 81.6% | 93.1% | 98.0% | 100.0% | 100.0% |
| 8dB | 56.0% | 71.1% | 87.1% | 96.7% | 99.6% | 100.0% | 100.0% |
| 9dB | 61.8% | 77.8% | 91.3% | 98.0% | 100.0% | 100.0% | 100.0% |
| 10dB | 67.8% | 82.7% | 94.7% | 98.9% | 100.0% | 100.0% | 100.0% |
| 11dB | 72.9% | 86.2% | 96.0% | 99.6% | 100.0% | 100.0% | 100.0% |
| 12dB | 76.9% | 90.4% | 97.1% | 99.6% | 100.0% | 100.0% | 100.0% |
| 13dB | 80.2% | 92.9% | 98.0% | 100.0% | 100.0% | 100.0% | 100.0% |
| 14dB | 82.9% | 94.7% | 98.9% | 100.0% | 100.0% | 100.0% | 100.0% |
| 15dB | 85.3% | 96.2% | 99.3% | 100.0% | 100.0% | 100.0% | 100.0% |

FIG. 9

DIGITAL RECEIVER TECHNIQUES IN RADAR DETECTORS

CROSS-REFERENCE TO RELATED APPLICATIONS

This application is a divisional of U.S. application Ser. No. 12/881,729 filed Sep. 14, 2010, which will issue as U.S. Pat. No. 8,988,272 on Mar. 24, 2015, which is a continuation-in-part of U.S. application Ser. No. 12/749,728 filed Mar. 30, 2010, now abandoned. Both applications are entitled "DIGITAL RECEIVER TECHNIQUES IN RADAR DETECTORS," and the entireties of both are incorporated by reference herein.

FIELD OF THE INVENTION

The present invention relates to radar detectors, and more particularly to radar detectors which detect police radar signals before the vehicle is within the detection range of the police radar unit.

BACKGROUND OF THE INVENTION

RADAR detectors warn drivers of the use of police RADAR, and the potential for traffic citations if the driver exceeds the speed limit. The FCC has allocated several regions of the electromagnetic spectrum for police RADAR use. The bands used by police RADAR are generally known as the X, K and Ka bands. Each relates to a different part of the spectrum. The X and K bands are relatively narrow frequency ranges, whereas the Ka band is a relatively wide range of frequencies. By the early 1990's, police RADAR evolved to the point that it could operate almost anywhere in the 2,600 megahertz wide Ka band. During that time RADAR detectors kept pace with models that included descriptive names like "Ultra Wide" and "Super Wide." More recently, police have begun to use laser (optical) systems for detecting speed. This technology was termed LIDAR for "light Detection and Ranging."

Unlike LIDAR, police RADAR directly determines a vehicle's speed by measuring the doppler shift in its returned frequency (such as the increasing or descreasing pitch of an approaching or receding train or emergency vehicle). Instant-on or pulsed low-powered RADAR has been in use for many years. For some time to come, this will likely constitute the greatest occurrence in any area that has not already switched exclusively to police laser speed enforcement. Most contemporary police RADAR guns operate on the wide Ka-band RADAR. K-band RADAR still is extremely common, given it historical advantage to Ka RADAR. X-band is also still widely deployed in some areas, however, newer digital (DSP) police RADAR guns are steadily coming on-line which operate primarily on the newer Ka band.

RADAR detectors typically comprise a microwave receiver and detection circuitry that is typically realized with a microprocessor or digital signal processor ("DSP"). Microwave receivers are generally capable of detecting microwave components in the X, K, and very broad Ka band. In various solutions, either a microprocessor or DSP is used to make decisions about the signal communicated from the microwave receiver. Systems including a digital signal processor have been shown to provide superior performance over solutions based on conventional microprocessors due to the DSP's ability to rapidly find and distinguish signals that are buried in noise.

The DSP or microprocessor in a contemporary RADAR detector is programmable. Accordingly, they can be instructed to manage all of the user interface features such as input switches, lights, sounds, as well as generate control and timing signals for the microwave receiver and/or a laser detector. Early in the evolution of the RADAR detector, consumers sought products that offered a better way to manage the audible volume and duration of warning signals. Good examples of these solutions are found in U.S. Pat. Nos. 4,631,542, 5,164,729, 5,250,951, and 5,300,932, each of which is hereby incorporated by reference, which provide methods for conditioning the response generate by the radar detector.

However, these and other radar detectors still typically have an analog basic detection method, usually involving an FM demodulator. The resultant analog signal is then processed by a digital microcontroller. A problem with using an analog detection technique is that the analog detection has a slow response time. Since a detector must scan a wide range of frequencies in search of radar signals, scan speed is an important aspect of the detector. Unfortunately, analog detection methods involving FM demodulators only allow detectors to look at a narrow frequency bands at specific times, in order to achieve good sensitivity to RADAR signals over any noise. The narrow bands may assist in the problem that many detectors have been faced with; namely, their inability to detect short pulsed radar signals, which may occur at any frequency in the X, K or Ka bands. In other words, it has become more difficult to achieve a good compromise between response time and sensitivity using narrow-band analog detection methods. This problem has become even more apparent lately as more RADAR guns have started to implement short pulsed sources, known as POP-mode RADAR.

The idea behind POP-mode RADAR is simple in principle. If a RADAR gun transmits a sole pulsed RADAR wave, and that transmission only lasts 67 ms, conventional RADAR detectors won't likely spot the RADAR beam of such short duration as they are busy sweeping (scanning) multiple bands within the X, K, and Ka bands. While the 67 ms version of POP-mode RADAR has essentially been mitigated by most of the major contemporary detector manufacturers, even quicker versions of POP-mode RADAR have been introduced having pulse durations of 16 ms. Even the top of the line models of the contemporary detectors struggle with identifying this shorter duration POP-mode and the detector only alerts to the pulsed waves about one out of every 10 bursts.

Therefore there is a need in the art for a RADAR detector that is able to sweep multiple bands with sufficient speed and sensitivity to be able to detect POP-mode and other short duration bursts.

SUMMARY OF THE INVENTION

Embodiments of the invention provide a method of detecting RADAR signals. RADAR channel data in a frequency range is received, where the frequency range may be divided into a plurality of equally wide channels. The received RADAR channel data is digitally processed and analyzed to identify a signal in the RADAR channel data in the frequency range. The frequency range is advanced to a next channel of the plurality of channels, where the frequency range of the next channel of the plurality of channels may be nonsequential with the frequency range of the first channel. The steps of receiving, processing, and analyzing may then be repeated for the next channel of the plurality of channels.

In some embodiments, digitally processing the received RADAR channel data includes concurrently averaging digitally converted samples of the RADAR channel data with digitally converted samples from previously received RADAR channel data. The concurrent averaging may be performed in parallel utilizing multiple averaging engines.

In some embodiments, analyzing the processed channel data to identify a signal in the RADAR channel data in the frequency range includes comparing samples to a predetermined threshold. The threshold may be a dynamic self-adapting threshold, where the threshold adapts to compensate for temperature variations.

In some embodiments, a pseudo-random channel pattern may be utilized for advancing to the next channel of the plurality of channels. In other embodiments, the next channel of the plurality of channels may be randomly selected from the plurality of channels. In these embodiments, statistical analysis may be employed to determine a number of times a channel of the plurality of channels has been analyzed to ensure each channel of the plurality of channels may be periodically analyzed.

Embodiments of the invention additionally provide an apparatus for detecting RADAR signals. The apparatus includes a receiver, a processor, and an averager module. The processor is in communication with the receiver and the averager module. The processor is configured to receive via the receiver RADAR channel data in a frequency range. The frequency range is divided into a plurality of equally wide channels. The processor may then digitally process the received RADAR channel data and analyze the processed channel data to identify a signal in the RADAR channel data in the frequency range. The processor advances the frequency range to a next channel of the plurality of channels, where the frequency range of the next channel of the plurality of channels is nonsequential with the frequency range of the first channel. The processor then repeats the steps of receiving, processing, and analyzing for the next channel of the plurality of channels.

In some embodiments, the receiver includes a RF antenna, a plurality of local oscillators, and a band pass filter. The plurality of local oscillators selects bands of frequency in the frequency range under control of the processor.

In some embodiments, the processor digitally processes the received RADAR channel data by concurrently averaging in the averager module digitally converted samples of the RADAR channel data with digitally converted samples from previously received RADAR channel data. The concurrent averaging may be performed in parallel utilizing multiple averaging engines within the averager module.

In some embodiments, the processor may be configured to analyze the processed channel data to identify a signal in the RADAR channel data in the frequency range by comparing samples to a predetermined threshold. The threshold in these embodiments may be a dynamic self-adapting threshold, where the processor may be configured to adapt the threshold to compensate for temperature variations.

In some embodiments, a pseudo-random channel pattern is utilized by the processor for advancing to the next channel of the plurality of channels. In other embodiments, the next channel of the plurality of channels is randomly selected by the processor from the plurality of channels. In these embodiments, the processor may statistically analyze a number of times a channel of the plurality of channels has been analyzed to ensure each channel of the plurality of channels is periodically analyzed.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention implement direct IF sampling techniques. This method does not involve an FM demodulator. An intermediate frequency of the detector may be digitized by a wide band analog-to-digital converter and the resulting digital stream of data may then be processed completely in the digital domain, making the embodiments truly digital radar detectors. Embodiments employing digital techniques also realize, through wide band digital sampling, a significant improvement in response time, as well as increase in sensitivity.

Figure 1:
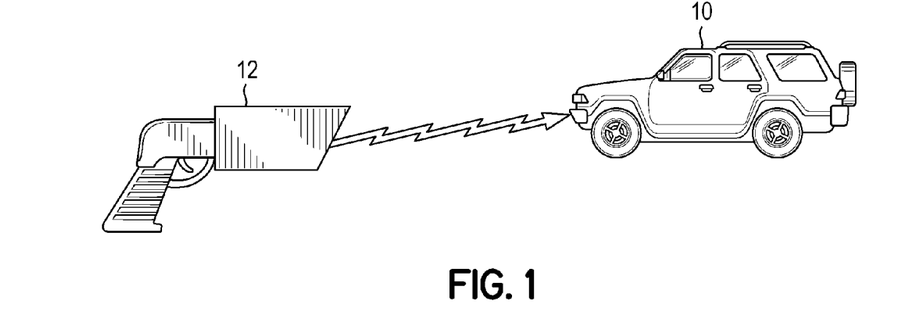
FIG. 1 is an illustration of a vehicle receiving RADAR signals from a police RADAR.

Referring now to FIG. 1, a vehicle 10 is illustrated in operation on a roadway, under exposure to radio frequency signals from a variety of sources including police sources, such as RADAR gun 12, as well as other non-police sources of interference from surrounding businesses, homes, etc. (not shown). Vehicle 10 is equipped with a RADAR detector capable of detecting both the police and non-police sources. In some embodiments, the RADAR detector may also be able to identify the present coordinate and/or velocity of the vehicle, e.g. using an associated GPS receiver or alternatively receive of land-based signals such as LORAN, as disclosed in U.S. Pat. No. 6,670,905 of the present assignee, which is hereby incorporated by reference in its entirety. In these embodiments, the RADAR detector is able to use this information to enhance its decision-making abilities.

Figure 2:
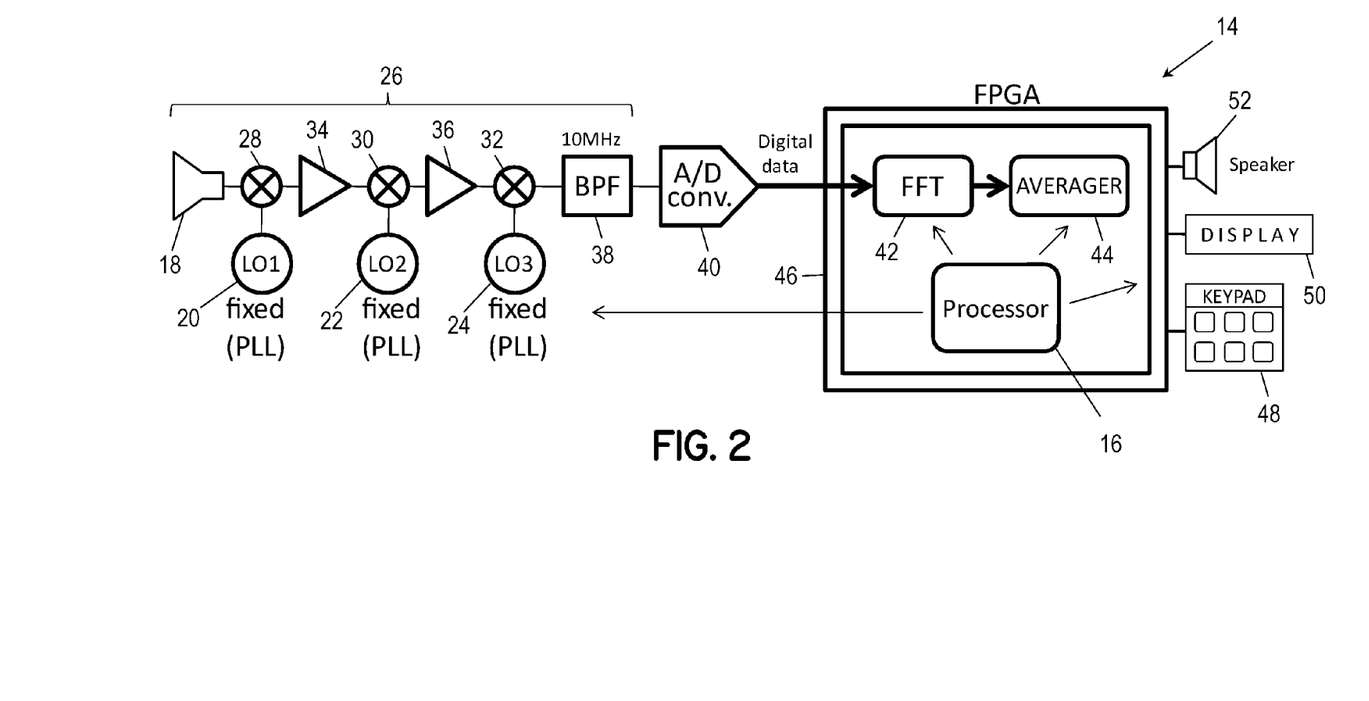
FIG. 2 is a block diagram of a RADAR detection circuit consistent with embodiments of the invention.

The RADAR detector 14, as illustrated in FIG. 2, includes a processor 16 for controlling all functions of the detector 14. Processor 16 receives information on RADAR signals from a microwave receiver 26. In some embodiments, and as seen in FIG. 2, three Local Oscillators, 20, 22, 24 are part of a super heterodyne receiver structure 26. Signals from each local oscillator 20, 22, 24 drives a mixer 28, 30, 32 which downconverts incoming signal to an intermediate frequency for ease of processing. At each stage, the mixer 28, 30, 32 creates a copy of the incoming signal at the frequency set by the difference between the original and the LO 20, 22, 24 frequencies. Signals from the first two stages are amplified by amplifiers 34, 36 before being transmitted to the next stage. In contemporary detectors, the first local oscillator 20 is typically controlled using analog methods by applying a ramp control voltage, in order to implement a frequency sweep.

In the embodiment in FIG. 2, a triple-conversion super heterodyne receiver 26 is used to assist in providing greater ability to implement necessary gain and selectivity as well as to avoid spurious products by properly selecting frequencies for the oscillators, although, one of ordinary skill in the art will recognize that other numbers of oscillators, mixers, and amplifiers may also be used. The frequency shifted input from the super heterodyne receiver 26 is then sent through a band pass filter 38, the bandwidth of which may be chosen based on a number of steps through the frequency range of interest. The frequencies of the first and second LOs 20, 22 are changed in steps by processor 16. At each step, the portion of bandwidth, also referred to herein as a channel, is digitized by the analog-to-digital converter (ADC) 40 and processed by the FFT 42 and Averager 44 modules under direction of the processor 16. By using the FFT 42, all signal processing, detection and recognition implemented in detector 14 may be performed digitally and in the frequency domain. After processing, the processor 16 changes the first and second LOs 20, 22 to the frequency corresponding to the next channel and the process repeats.

In some embodiments, the FFT 42, Averager 44, and processor 16 may be implemented on a FPGA 46 or ASIC. In other embodiments, theses components may be integral in the processor or implemented as separate hardware components. By using an FPGA 46, as opposed to a conventional DSP processor, improved digital processing throughput may be realized at a lower cost. Additionally, an FPGA 46 allows for implementation of several digital functions executing in parallel, such as, for example the Averager 44. The ability to parallel process may assist in realizing reduced times when running multiple concurrent averaging engines, which process the same signals during averaging. In some embodiments, processor 16 may further be programmed to manage and report detected signals in various ways depending on its stored program. Embodiments of the RADAR detector 14 may also incorporate a user input keypad 48 or switches. Processor 16 may be further connected to a display 50, which may include one or more light emitting diodes for indicating various status conditions, or in a more feature-rich device, may include an alphanumeric or graphical display for providing detailed information to a user. A speaker 52 may also be provided to enable processor 16 to deliver audible feedback to a user under various alert conditions.

Processor 16 may also include other interfaces (not shown), such as an ODB II compliant interface, for connection to vehicle electronic systems that are built into the vehicle 10. Most modern vehicles are being equipped with standardized information systems using the so-called ODB II standard interface. This standard interface is described in an article entitled "ODB II Diagnostics," by Larry Carley, from Import Car, January 1997, which is hereby incorporated herein by reference. Processor 16, using the ODB II standard interface, may be able to obtain vehicle speed and other vehicle status information directly from the vehicle.

The entire bandwidth of interest is approximately 3 GHz. In some embodiments, this overall bandwidth may be effectively divided into about 300 channels, each approximately 10 MHz wide. In these embodiments, a combination of changes in the first and second local oscillators 20, 22 may result in effective 10 MHz steps of the incoming RF frequency in the super heterodyne receiver 26. In other embodiments, the bandwidth may be divided into a different number of channels at different bandwidths.

Figure 3:
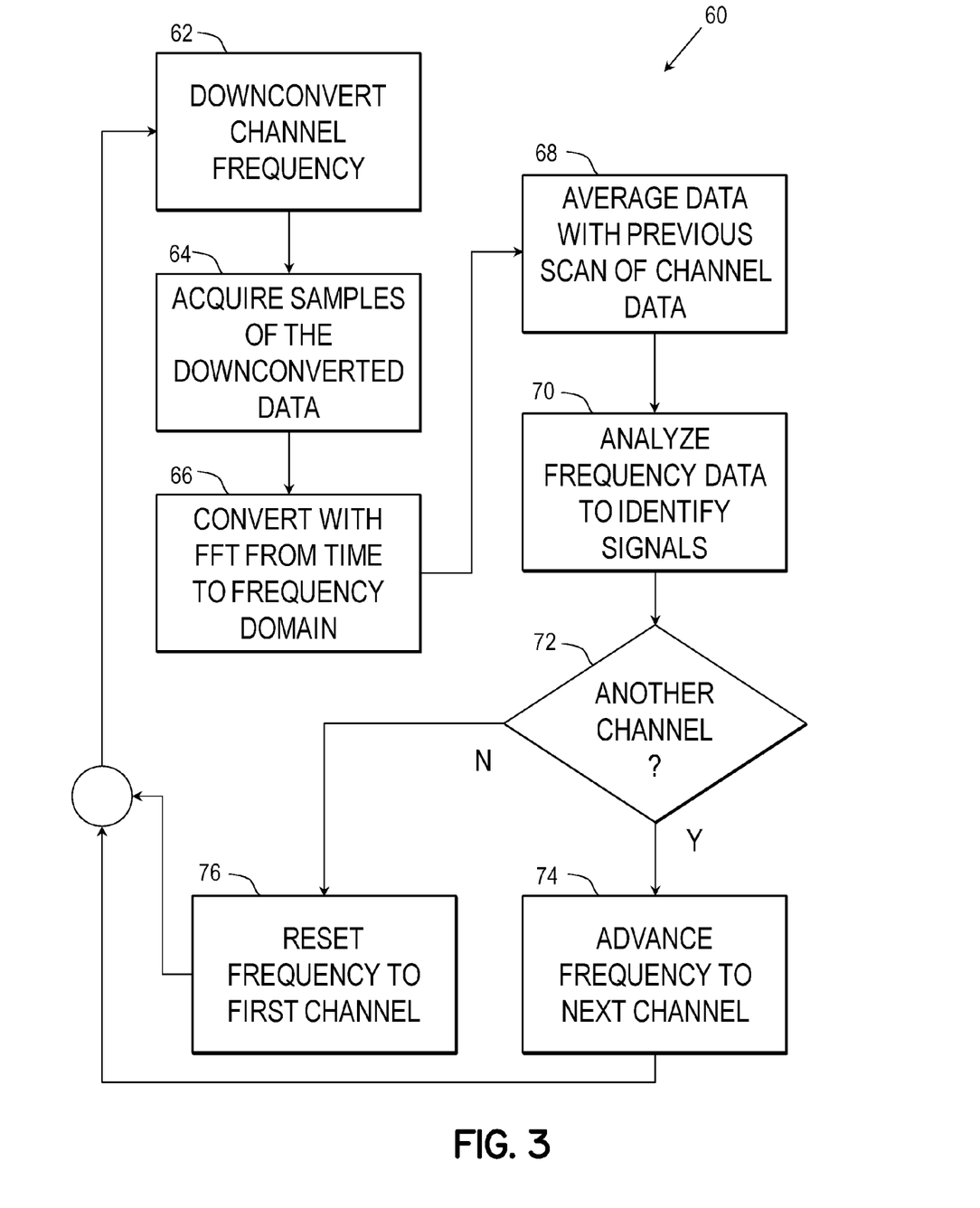
FIG. 3 is a flowchart illustrating digital processing for the RADAR detection circuit of FIG. 2.

At each of the approximately 10 MHz steps, and as seen in the flowchart 60 in FIG. 3, the following processes may occur. First, the channel is downconverted to an intermediate frequency for processing (block 62). The ADC 40 acquires 1024 samples of data (block 64) to create a digital snapshot of the data in some embodiments, though other numbers of samples may also be used. Next, an FFT processor 42 running under control of processor 16 converts the sampled data from the time domain to the frequency domain (block 66). Then, the new frequency data may be averaged together with several previous scans/snap shots from the same channel (block 68) to assist in reducing peak-to-peak noise variations. This process effectively reduces noise floor, and improves resultant sensitivity. However, the more averaging is applied to a portion of spectrum—the longer it takes to complete the analysis. Therefore, in order to detect weak signals of longer duration, it is appropriate to apply a greater amount of averaging; however, for stronger signals of short duration, less averaging should be applied, in order to maintain fast response. To assist in faster response times, as set forth above, the averaging may be accomplished using multiple averaging engines concurrently performing analysis of the frequency data. Usage of parallel digital pipelines of the FPGA 46 may assist in implementing the concurrent processing to achieve both speed and sensitivity, such as through implementation of several averaging engines running in parallel. As a result, short duration but stronger signals (such as POP) may be detected at the output of the X1 or X8 averaging engines, and at the same time, weak signals may also be detected at the output of the X64 averaging engine. (X1, X8 and X64 averaging amounts are just one possible scheme of distribution of averaging for a particular embodiment. Other embodiments may employ other distributions of averages). Finally, an amplitude of each frequency component in the spectrum is analyzed and any signals present in the spectrum are identified (block 70). Fully digital processing, executing in the frequency domain may assist in producing spectrum snap-shots of large ranges of bandwidth in the spectrum of interest. This may then provide an opportunity for a digital processor to use pattern-recognition techniques to analyze and detect specific types of radar sources in some embodiments. For example, park-assist systems or automatic cruise control radar systems employed in certain cars may generate false-alarms, unless the source of the signal is properly recognized, based on specific frequency components in the signal, and their specific relation to one another, as determined by high speed DSP spectral analysis of the received signal.

At the completion of the analysis, the next channel is analyzed. If there is another channel to analyze ("Yes" branch of decision block 72), then the processor adjusts the frequencies of the first and second LOs 20, 22 (block 74) and the process continues at block 62. If there are no further channels ("No" branch of decision block 72), then the frequencies of the first and second LOs 20, 22 are reset to the base frequency of the region of interest (block 76) and the process continues at block 62.

Figure 4:
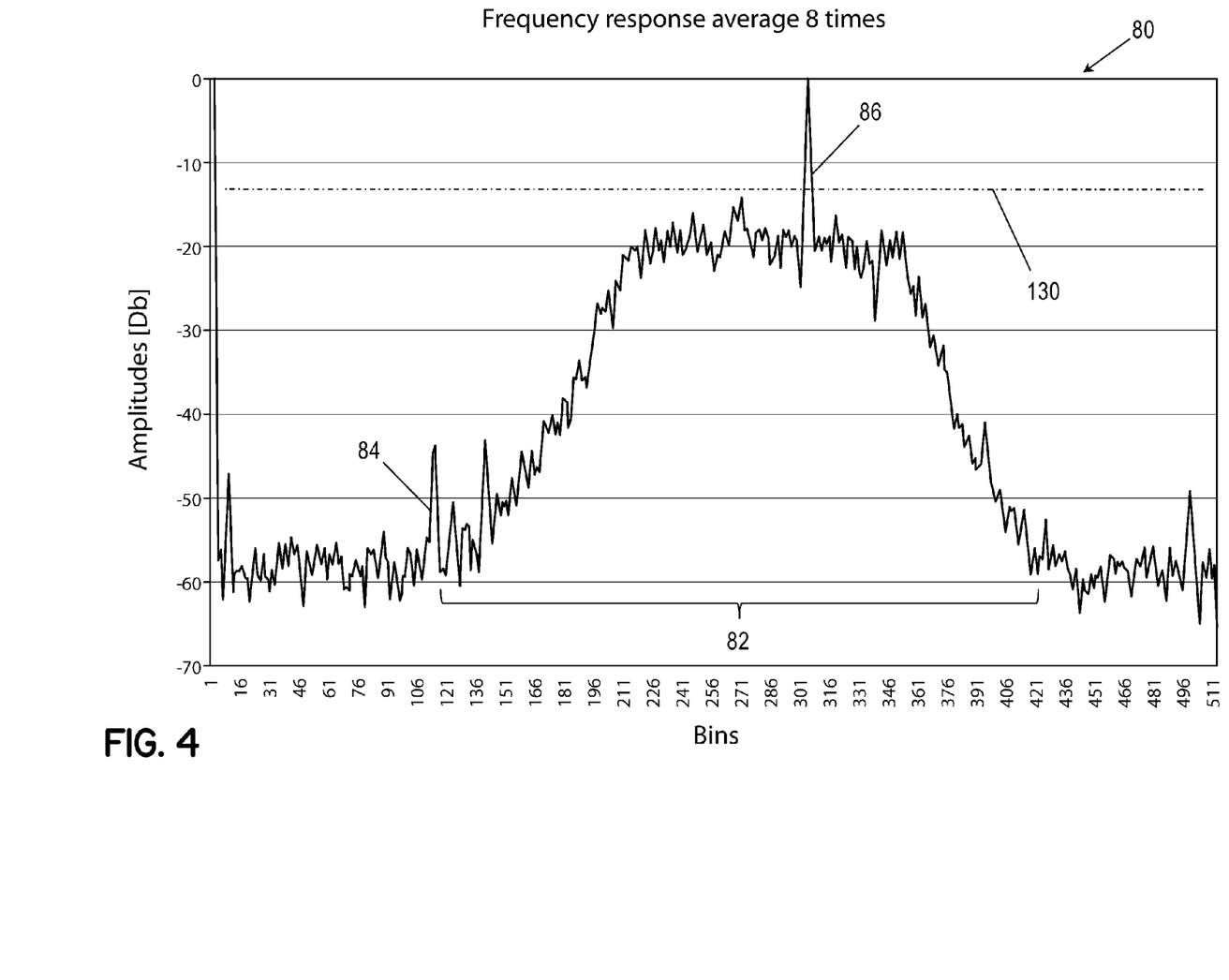
FIG. 4 is a graph of sample frequency response data.

The following examines potential capabilities of this system in terms of final sensitivity as well as requirements of processing time and implementation costs. Graph 80 in FIG. 4 illustrates a sample of what the frequency response data may look like. The broad hill 82 of curve 84 represents the channel bandwidth and the peak 86 in the center is a signal to be detected. In some embodiments, a detection scheme may employ a threshold placed just above the highest noise peak in the spectrum. The sensitivity of the system many be affected by many factors, two of which include bandwidth and peak-to-peak variation. The first factor is the final system bandwidth. It is possible to lower the absolute (average) noise floor of the system by reducing final system bandwidth.

The final bandwidth of a sampled system depends on the sampling rate and the number of samples:

$$BW = \frac{F_S}{N} \quad (1)$$

Figure 5:
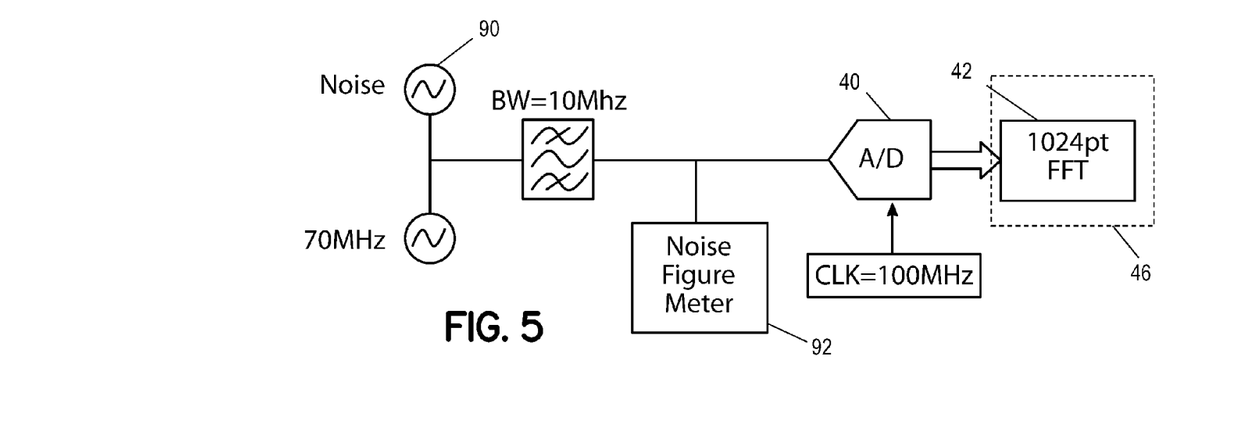
FIG. 5 is a detailed block diagram of the digital receiving portion of FIG. 2 with a noise input source.

BW is also the resolution or bin size of the frequency response calculated using Fourier Transform. For example, 1024 points acquired at 32.5 MHz rate produce 31.7 kHz final bandwidth. As seen in FIG. 5, with only Noise source 90 connected to the input, equivalent noise power was measured using Noise Figure Meter 92 as 103.3 dBm (A) above absolute noise floor in a 1 MHz ($B_1$) bandwidth. A 1024 point FFT 42 calculated on a signal sampled at 100 MHz should yield a 97.7 kHz ($B_2$) final bandwidth. Therefore the final noise floor due to FFT should be reduced to:

$$F = -114 + A - 10 \times \log\left(\frac{B_1}{B_2}\right) = -20.8 \text{ dBm} \quad (2)$$

where the constant −114 is the thermal noise power in dBm measured in the 1 MHz bandwidth.

Figure 6:
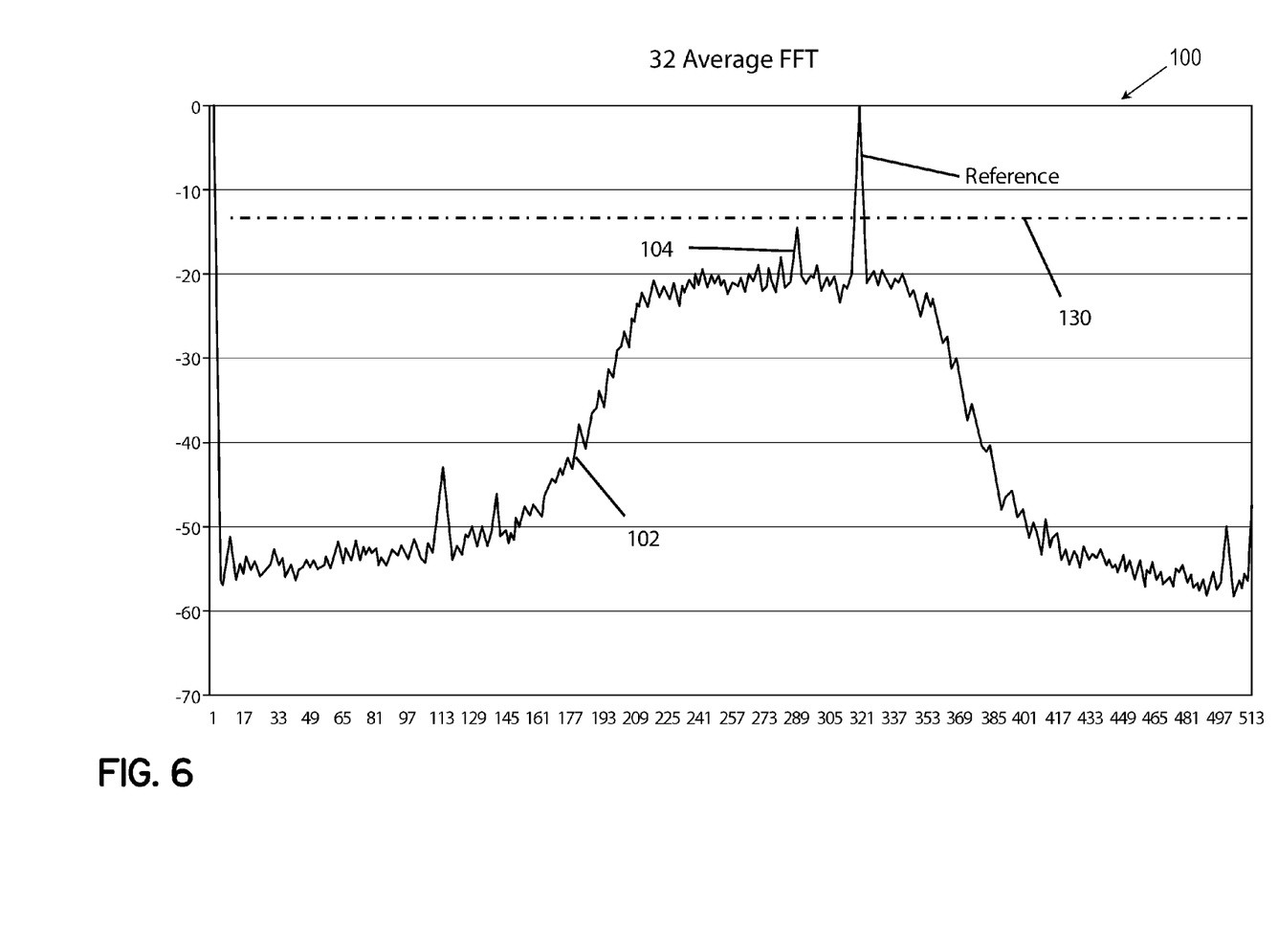
FIG. 6 is a graph of an averaged noise floor.

A signal was applied in the center of filter passband having an amplitude of 6 dB higher than F and 32 FFT results were averaged together. The graph 100 in FIG. 6 illustrates these results. The curve 102 does show a signal 104 approximately 6 dB above average noise floor, therefore the bandwidth reduction due to FFT is in fact what was predicted above.

In order to estimate system sensitivity it is convenient to compare this system to characteristics of the existing detectors. Some existing detector units are able to detect approximately 0 dB signal-to-noise ("S/N") ratio having final bandwidth of 400 kHz. Therefore the sensitivity improvement in dB considering only bandwidth reduction alone would be:

$$\text{improvement} = 10 \times \log\left(\frac{400 \text{ kHz}}{BW}\right) \quad (3)$$

In this case, 512 samples would make approximately an 8 dB sensitivity improvement over existing detectors. Using 1024 samples would yield approximately an 11 dB improvement and 2048 samples would yield approximately a 14 dB improvement.

Figure 7A:
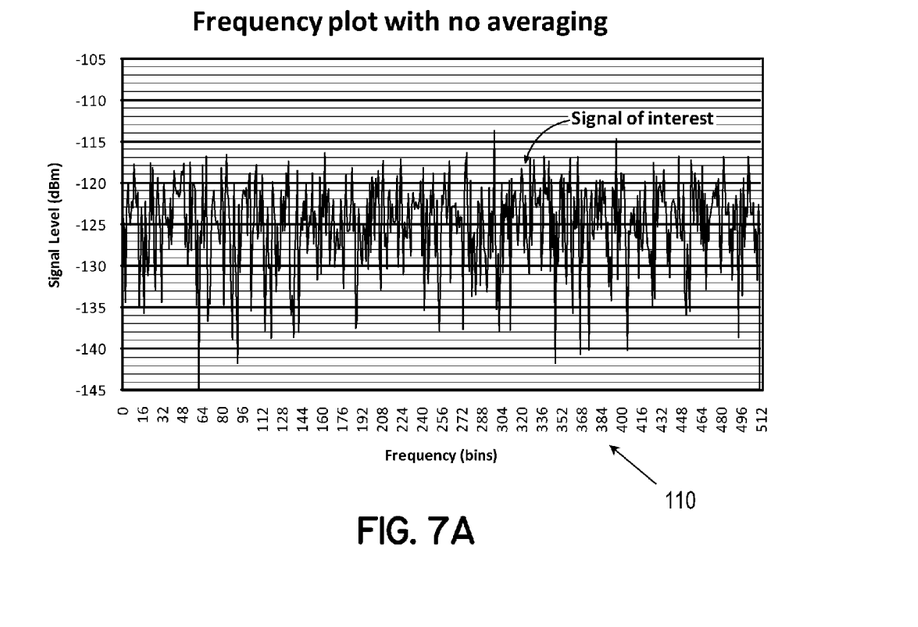
FIGS. 7A-7C are frequency plots of noise frequency data over different average configurations.
Figure 7B:
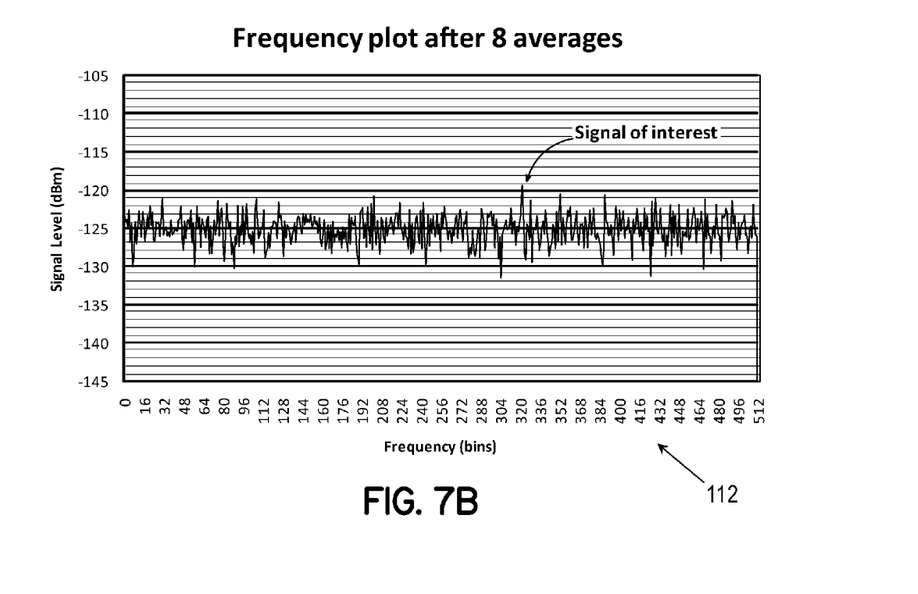
Figure 7C:
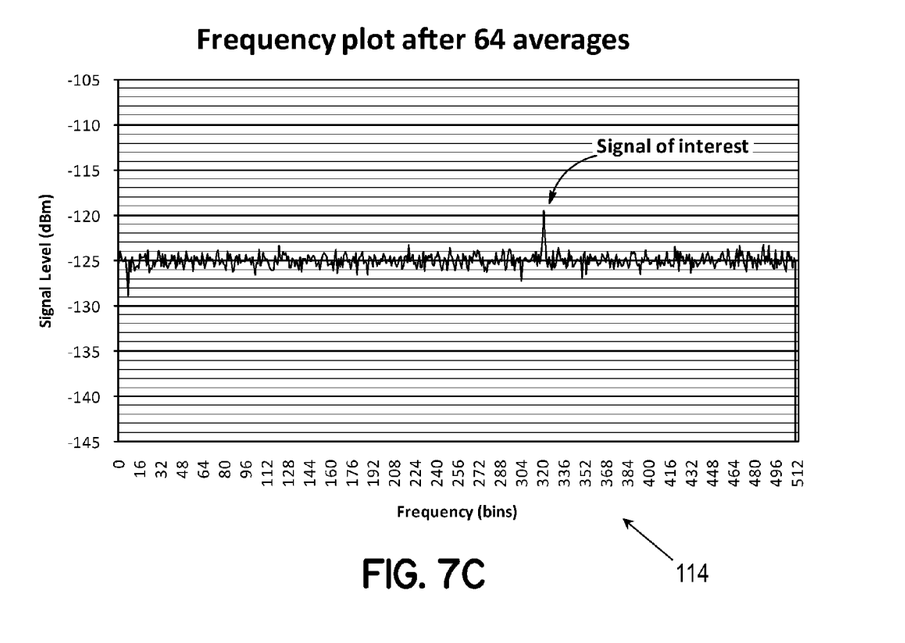
Figure 8A:
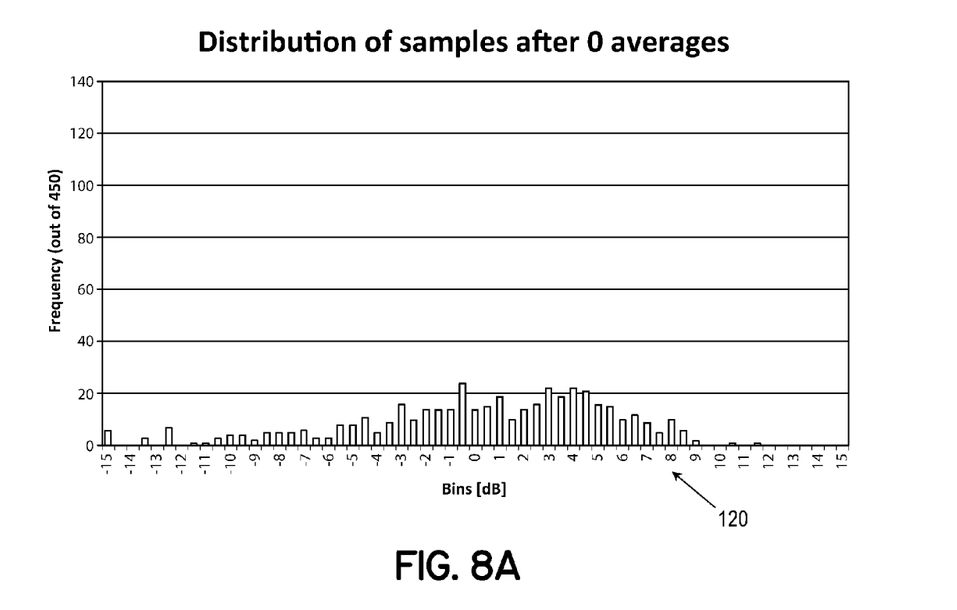
FIGS. 8A-8C are corresponding histogram plots for the frequency plots in FIGS. 7A-7C.
Figure 8B:
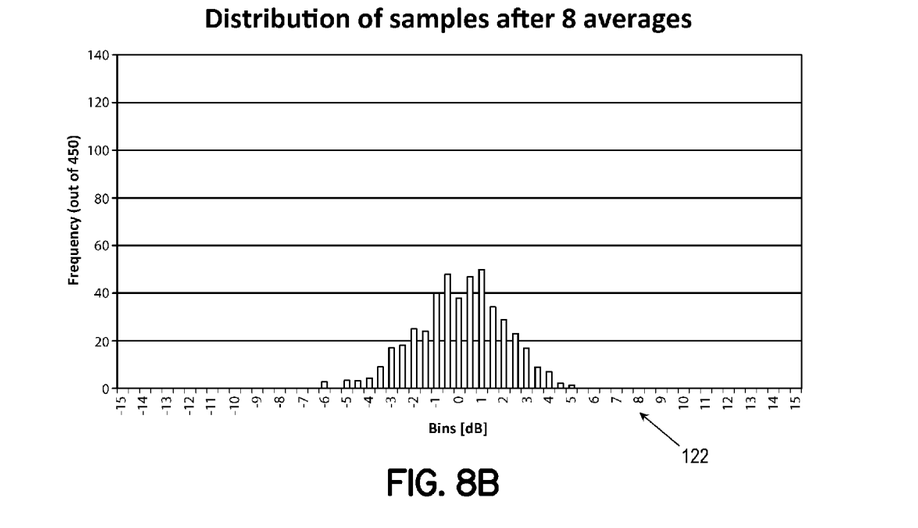
Figure 8C:
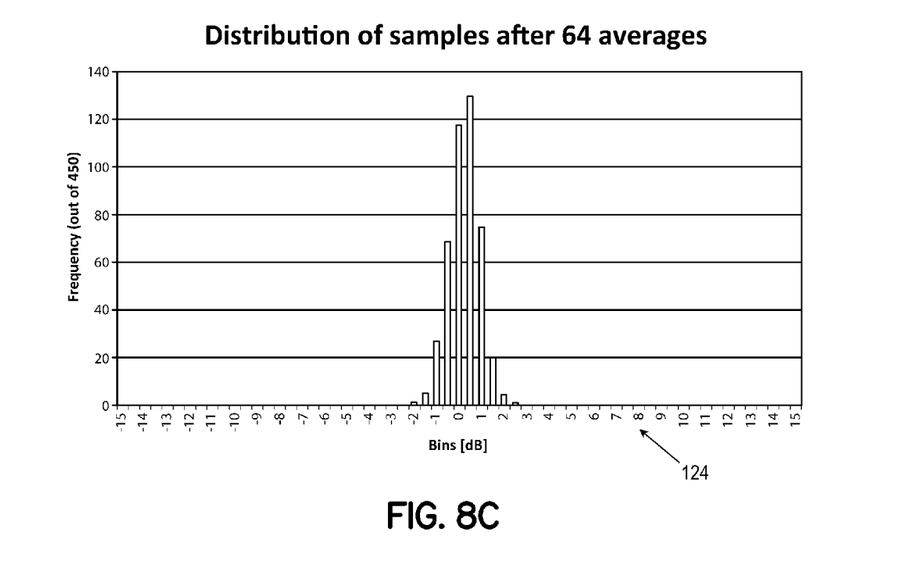
Figure 9:
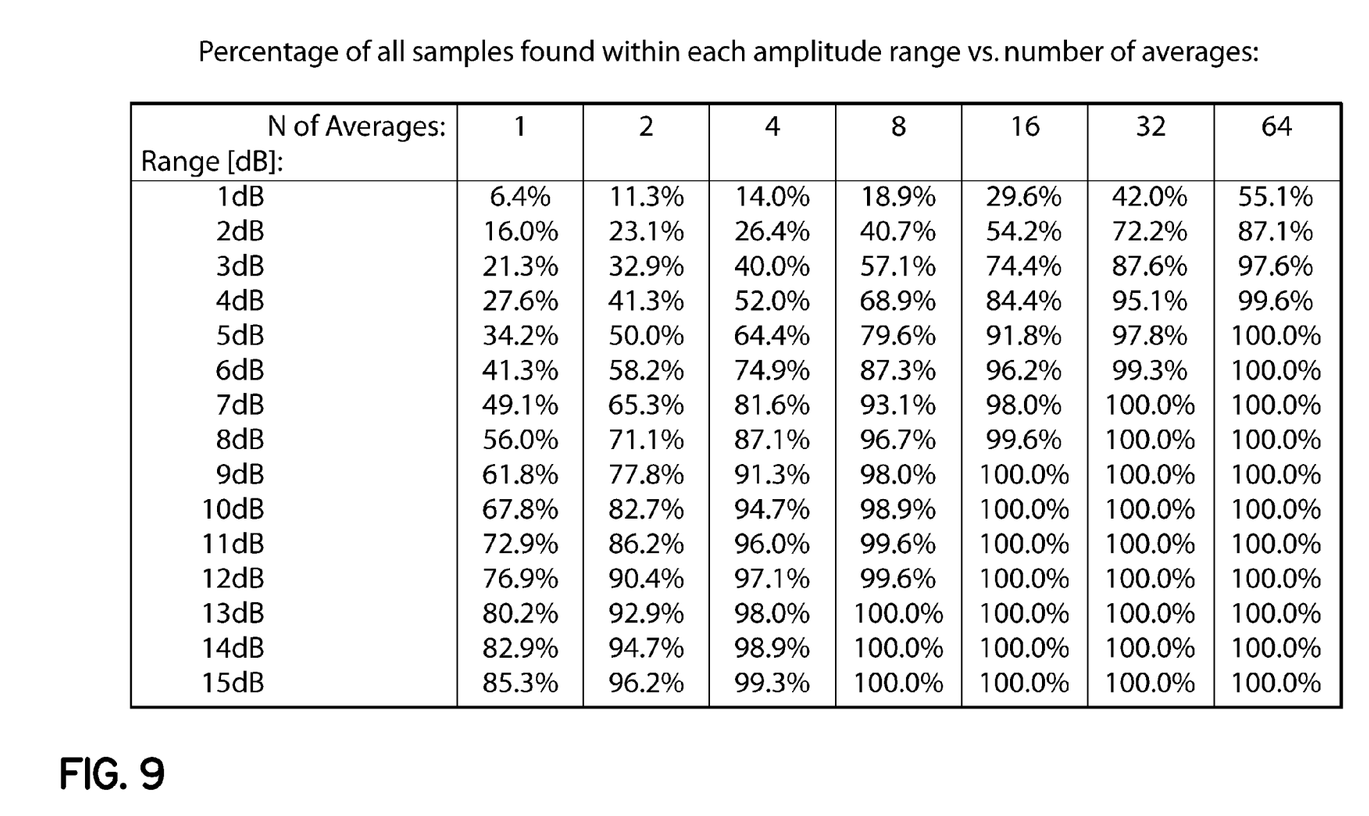
FIG. 9 is a table of the percentage of samples found within an amplitude range vs. the number of averages.

The second factor is the peak-to-peak variation in the noise floor. As can be seen below, averaging several consecutive frequency scans may assist in reducing this variation. To test this theory, a broadband noise source was connected to the input of the evaluation board for National Semiconductor's ADC08100 A/D converter. A converter running at 100 MHz captured 64 batches of time domain data at 1024 samples each. An FFT was performed on the captured data creating 64 frequency response batches. The frequency data was then averaged together in several configurations (0, 2, 4, 8, 16, 32, and 64). These results for no averaging, 8 averages, and 64 averages may be found in the graphs 110-114 in FIGS. 7A-7C. For each configuration plotted in graphs 110-114 in FIGS. 7A-7C, a histogram of sample variations was also plotted in graphs 120-124 in FIGS. 8A-8C. As the number of averages increases, the samples get nearer to the true average noise value. For example, as seen in the table in FIG. 9, after 8 averages, 98% of all samples will lie within ±4.5 dB (9 dB range) of the true average value. Thus averaging consecutive frequency scans assists in reducing any peak-to-peak variation in the noise floor.

Figure 10:
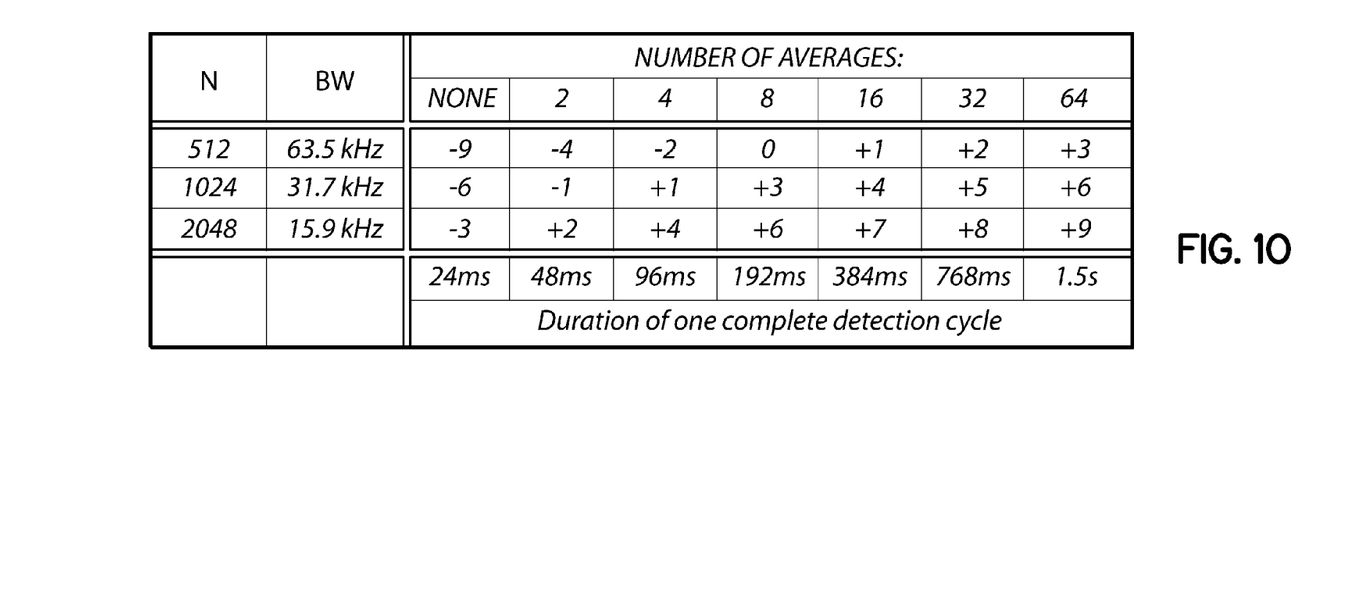
FIG. 10 is a table summarizing the factors that affect final sensitivity of the detector system.

The table in FIG. 10 summarizes the combination of both factors—system bandwidth and peak-to-peak variation—that have been shown to affect final sensitivity of the system. The actual numbers were additionally degraded by 2 dB to allow for a "safety factor" in setting a threshold above noisy spectrum. The numbers in the body of the table represent a change in sensitivity (in dB) compared to earlier model detectors. In this table, a '−' means a degradation in sensitivity, and a '+' means an improvement in sensitivity.

In order to determine any improvements in sensitivities, 1024 samples and 8 averages were considered. As illustrated above, the noise floor drops due to bandwidth alone by approximately 11 dB when compared to earlier units. As seen in the table in FIG. 9, after 8 averages almost 100% of samples will lie within ±6 dB (12 dB range) of the true average value. Therefore, when setting the threshold value for noise determination, the threshold should be placed 6 dB above average noise floor 130 plus 2 dB safety factor as seen in FIGS. 4 and 6. Thus, the sensitivity improvement for 1024 samples and 8 averages is: 11 dB−6 dB−2 dB=3 dB.

The threshold is set just above the noise floor 130, such that any signal of interest occurring in spectrum should cross the threshold and produce an alarm condition. This threshold, in some embodiments, may be generated as a self-adapting threshold, to envelop any uneven fluctuations in the noise floor 130, maximizing the effectiveness of the detection method. This dynamic threshold may slowly and constantly be adjusted during the working of the detector in order to compensate for changes in the parameters of the system due to temperature, aging, etc.

Another factor that may affect actual sensitivity of the system is an incoming signal or LO drift or jitter. For example if the signal drifts across two FFT bins during a complete averaging cycle, then the height of the peak in the frequency response may be lower by as much as 3 dB compared to what it would have been if no drift had occurred. If the signal drifts across four FFT bins, then the peak may be down by as much as 6 dB, etc. But, the fewer number of averages taken in the cycle, the less time it takes for detection, and thus the smaller signal drift would be.

A synthesized local oscillator's drift is generally due to a reference crystal temperature instability, which typically changes very slowly and thus does not greatly affect sensitivity. The phase noise of the oscillator is also a fraction of a kilohertz, well below the FFT bin size. The incoming signal, however, is usually far less stable. In many cases RADARs have gun oscillators as their sources because they are typically powerful and generally have low phase noise. However, these gun oscillators drift significantly, especially immediately after being turned on. For example, a typical X-band gun oscillator, upon power up at room temperature, can drift as much as 400 kHz in the first second. But, after about three seconds the drift virtually stops.

During a complete detector sweep, lasting for example about 300 ms, an incoming signal can drift approximately 200 kHz, which is about 6-7 bins for a bin size of about 31.7 kHz. In this situation, the overall effective sensitivity may be reduced by as much as 8 dB. However, if the incoming signal is not too weak as to be detected at the limits of sensitivity, then the signal may be detected much faster than after 8 averages and may not drift far enough to degrade "instant-on" performance. But, considering the worst case scenario, a typical gun oscillator drifts only about 20 Hz in the time it takes to do one scan of one channel with no averaging (approximately 30 µs). This is very small compared to the FFT bin size to make any significant difference on performance.

The performance of the embodiments of the invention depends in part on the processing power of the DSP chip. Several processors were found to be capable of processing a 1024-point FFT algorithm in about 50-60 µs at fairly low cost. Two examples are the TMS320C6204 from Texas Instruments and the ADSP-21532 "Blackfin" from Analog Devices. In general, the main portion of total time necessary to run a complete processing chain will likely be consumed by the FFT routine (approximately 60 µs). Extra postprocessing and averaging of data for a DSP running at 200 MHz approximately adds another 20 µs. Transfer of data from A/D converter to DSP (approximately 32 µs) may be accomplished in the background using DMA and therefore need not be taken into the account.

Dividing total scanning range of about 3 GHz into approximately 10 MHz steps results in 300 channels to scan. Considering the case when 8 averages are taken at each step, the total processing time for the entire scanning range amounts to:

$$(60+20) \, \mu s \times 8 \, avg \times 300 \, steps = 192 \, ms \quad (4)$$

This is faster than scans from contemporary detectors that complete in about 300 ms. In addition to be able to scan faster, as established above, embodiments of the invention also provide a 3 dB improvement in sensitivity.

Analysis of a detection scheme using digital receiving technique exposes several advantages in using this system compared to traditional FM demodulator detection. The example configurations of embodiments used throughout this disclosure produce approximately a 3 dB improvement in overall sensitivity compared to contemporary detectors while achieving this improvement about 30 percent faster than contemporary detectors. With a proper choice of first LO frequency it is possible to scan K and portion of the Ka band simultaneously, which should further reduce processing time. In case a signal is detected in this overlapped region, it may be necessary to rescan the area around the signal to identify the actual band the signal is coming from, however this process should still be much faster than scanning K and Ka bands separately. Because sensitivity and speed are under software control, it is possible to redistribute different levels of performance to different bands of interest. For example certain bands may be scanned with higher number of averages than others thus achieving even better sensitivity and/or speed levels.

In general, the digital architecture of the embodiments of the detector assists in balancing between sensitivity and response time. This balance may also be dynamically shifted depending on situation providing greater flexibility in control of the performance.

Contemporary RADAR detectors typically sweep their first LO linearly and slowly in order to scan the entire bandwidth of interest. However, the LO signal usually leaks into the environment, allowing other devices (RADAR-detector detectors) to identify the presence of this detector, which is can be undesirable. But, in the fully digital platform, the first LO is fixed by a phase-lock-loop, setting its frequency in steps in order to cover the entire spectrum. At each step, the oscillator's frequency is fixed for a very short duration (typically 25 micro sec) while the channel is being digitized. Given the digital nature of this process, such steps need not be performed in sequential order, as long as all required frequency channels are covered. The order of these channels may be made pseudo-random (predetermined fixed non-sequential sequence), which may assist in making detection and identification of this device more difficult. The seemingly random jumping of the first oscillator's frequency will effectively spread its radiated energy over a wide band, making the detector 14 harder to detect. Some embodiments of the detector 14 may also utilize several pseudo-random patterns, cycling through each pattern, again making the detection and identification of the device more difficult. Other embodiments may employ a fully random order of the channels. In these embodiments, statistics may be utilized to determine how often a particular channel is visited, in order to ensure that each channel gets visited periodically.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of detecting a RADAR signal, comprising:
   a. receiving a RADAR signal in a police RADAR frequency range, into a heterodyne receiver utilizing a local oscillator, the heterodyne receiver frequency shifting the RADAR signal to a baseband;
   b. sampling the RADAR signal in the baseband with an analog to digital converter to produce a time domain sampled representation of the baseband RADAR signal;
   c. wherein a frequency of the local oscillator is not swept during the steps of receiving and sampling the RADAR signal;
   d. analyzing the time domain sampled representation of the baseband RADAR signal to identify an apparent police originated signal in a police RADAR frequency range;
   e. alerting to the present of the apparent police originated signal.

2. The method of claim 1, wherein the police frequency range encompasses the X, K, and Ka RF bands.

3. The method of claim 1, further comprising converting the time domain sampled representation of the baseband RADAR signal to a frequency domain representation.

4. The method of claim 1, further comprising forming an average of the frequency domain representation of the baseband RADAR signal with a frequency domain representation of a previously received RADAR signal.

5. The method of claim 4, further comprising comparing the average of the frequency domain representations to a threshold.

6. The method of claim 5 wherein the threshold is a dynamic self-adapting threshold.

7. The method of claim 1, further comprising altering the frequency of the local oscillator and then performing the steps of:
   a. receiving a further RADAR signal in a police RADAR frequency range into a heterodyne receiver utilizing a local oscillator, the heterodyne receiver frequency shifting the further RADAR signal to a baseband, and
   b. sampling the further RADAR signal in the baseband with an analog to digital converter to produce a time domain sampled representation of the baseband further RADAR signal.

8. The method of claim 1 wherein the frequency of the local oscillator is altered repeatedly to receive RADAR signals in a plurality of RADAR frequency ranges.

9. An apparatus for detecting a RADAR signal, comprising:
   a. a heterodyne receiver receiving a RADAR signal in a police RADAR frequency range, comprising a local oscillator and a mixer using the local oscillator to frequency shift the RADAR signal to a baseband;
   b. an analog to digital converter sampling the RADAR signal in the baseband to produce a time domain sampled representation of the baseband RADAR signal wherein a frequency of the local oscillator is not swept during the steps of receiving and sampling the RADAR signal; and
   c. a processor analyzing the time domain sampled representation of the baseband RADAR signal to identify an apparent police originated signal in a police RADAR frequency range.

10. The apparatus of claim 9, wherein the wherein the police frequency range encompasses the X, K, and Ka RF bands.

11. The apparatus of claim 9, wherein the processor digitally processes the received RADAR channel data by converting the time domain sampled representation of the baseband RADAR signal to a frequency domain representation.

12. The apparatus of claim 9, wherein the processor is configured to form an average of the frequency domain representation of the baseband RADAR signal with a frequency domain representation of previously received RADAR signal.

13. The apparatus of claim 12, wherein the processor is configured to compare the average of the frequency domain representations to a threshold wherein the threshold is a dynamic self-adapting threshold.

14. The apparatus of claim 13 wherein the threshold is a dynamic self-adapting threshold.

15. The apparatus of claim 9, wherein the processor is configured to alter the frequency of the local oscillator and then cause the heterodyne receiver to receive a further RADAR signal in a police RADAR frequency range and frequency shift the RADAR signal to a baseband, and cause the analog to digital converter to produce a time domain sampled representation of the baseband further RADAR signal.

16. The apparatus of claim 9, wherein the processor is configured to cause the frequency of the local oscillator to alter repeatedly to receive RADAR signals in a plurality of RADAR frequency ranges.

17. The apparatus of claim 9, further comprising a user interface.

18. The apparatus of claim 17, wherein the user interface comprises:
   a. a speaker;
   b. a display; and
   c. a keypad.

* * * * *

UNITED STATES PATENT AND TRADEMARK OFFICE
CERTIFICATE OF CORRECTION

PATENT NO. : 9,557,408 B2
APPLICATION NO. : 14/665585
DATED : January 31, 2017
INVENTOR(S) : Igor Chernukhin Page 1 of 2

It is certified that error appears in the above-identified patent and that said Letters Patent is hereby corrected as shown below:

In the Specification

Column 2, Line 12: delete "generate" and insert --generated--

Column 2, Line 24: delete "a" before "narrow frequency bands"

Column 8, Line 49: insert --the-- between "in" and "spectrum"

Column 8, Line 67: insert --the-- between "smaller" and "signal"

Column 9, Line 61: insert --a-- between "K and" and "portion"

Column 10, Line 9: insert --a-- between "depending on" and "situation"

Column 10, Line 16: delete "is" between "which" and "can be"

In the Claims

Column 10, Line 51, Claim 1: replace "receiving a RADAR" with --receiving the RADAR--

Column 10, Line 64, Claim 1: replace "a" with --the--

Column 10, Line 66, Claim 1: replace "present" with --presence--

Column 11, Line 1, Claim 2: insert --RADAR-- between "police" and "frequency"

Column 11, Line 6, Claim 4: replace "claim 1" with --claim 3--

Column 11, Line 19, Claim 7: replace "a police RADAR" with --the police RADAR--

Signed and Sealed this
Fourth Day of December, 2018

Andrei Iancu
*Director of the United States Patent and Trademark Office*

CERTIFICATE OF CORRECTION (continued)
U.S. Pat. No. 9,557,408 B2

Column 11, Line 20, Claim 7: replace "a heterodyne" with --the heterodyne--

Column 11, Line 20, Claim 7: replace "utilizing a" with --utilizing the--

Column 11, Line 22, Claim 7: replace "a baseband" with --the baseband--

Column 11, Line 24, Claim 7: replace "an analog" with --the analog--

Column 11, Line 29, Claim 8: insert --police-- between "plurality of" and "RADAR"

Column 11, Line 32, Claim 9: replace "a RADAR" with --the RADAR--

Column 12, Line 3, Claim 9: replace "a police RADAR" with --the police RADAR--

Column 12, Line 5, Claim 10: delete "wherein the"

Column 12, Line 6, Claim 10: insert --RADAR-- between "police" and "frequency"

Column 12, Line 13, Claim 12: replace "claim 9" with --claim 11--

Column 12, Line 26, Claim 15: replace "a police RADAR" with --the police RADAR--

Column 12, Line 27, Claim 15: insert --further-- between "shift the" and "RADAR"

Column 12, Lines 32 through 33, Claim 16: insert --police-- between "plurality of" and "RADAR"